Aug. 1, 1933.  F. J. BAST  1,920,458
CONTROL VALVE
Filed Jan. 31, 1930
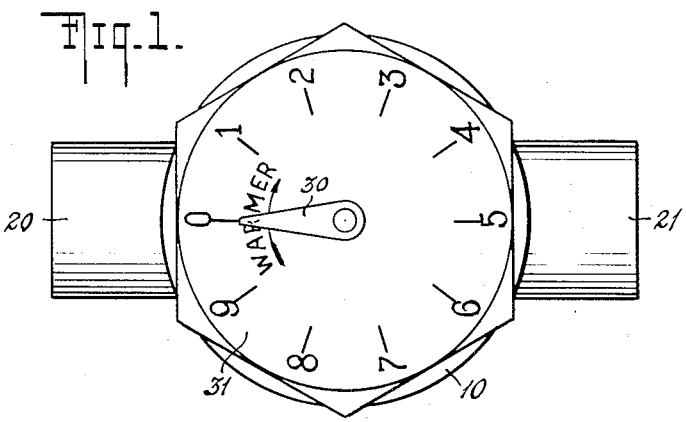
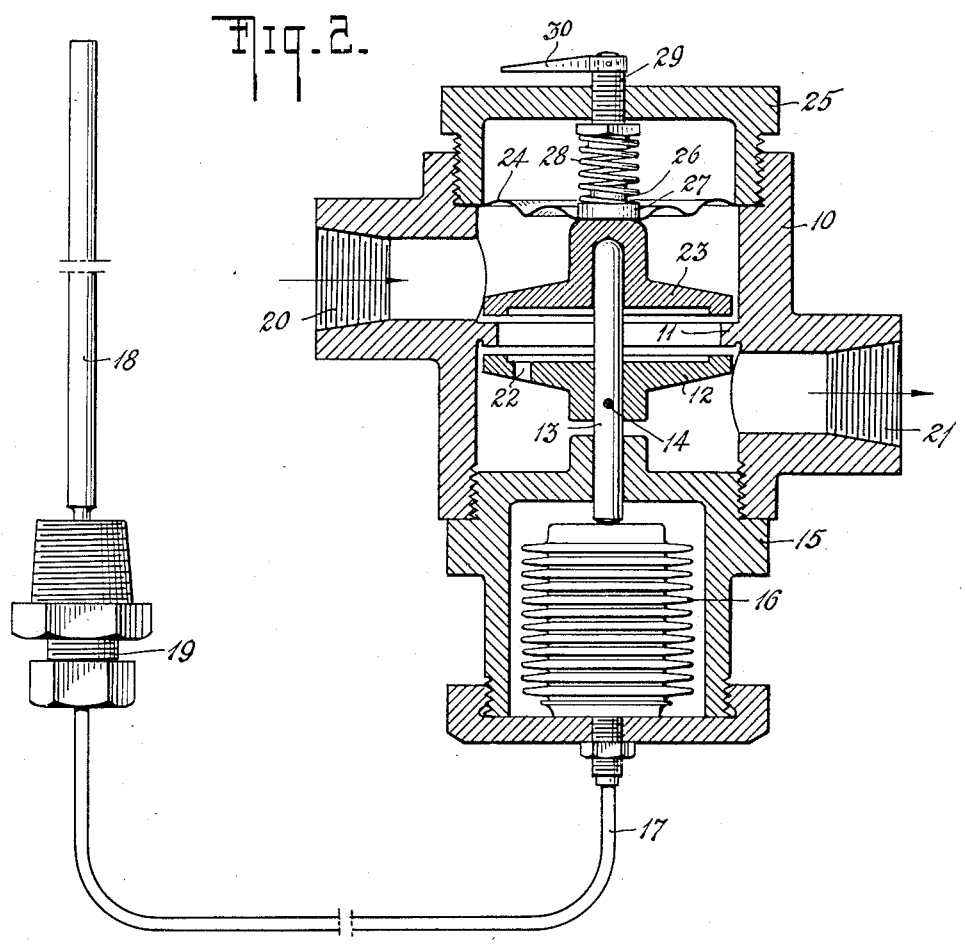
WITNESS
G. V. Rasmussen
INVENTOR
FRANK J. BAST
BY
ATTORNEYS Patented Aug. 1, 1933

1,920,458

UNITED STATES PATENT OFFICE 1,920,458

CONTROL VALVE

Frank J. Bast, Queens Village, N. Y., assignor to Charles J. Tagliabue Mfg. Co., Brooklyn, N. Y., a Corporation of New York Application January 31, 1930. Serial No. 424,768

8 Claims. (Cl. 236—99)

My invention relates to control valves of the type which automatically controls the flow of a fluid, such as fuel gas, steam, air, hot or cold water, brines, etc., to a burner, a heating or cooling vessel or other apparatus, in response to temperature or pressure variations at a selected point. Valves of this type are usually provided with, or are associated with, a temperature or pressure responsive member generally composed of an expansible chamber which, in the case of temperature control, is connected by means of a conduit to a thermostatic bulb placed at such selected point; or, where the control of the valve is effected in response to pressure variations, is connected through a conduit directly to the vessel whose pressure fluctuations are to affect such valve. The arrangement of the valve and the expansible chamber is usually such, that upon expansion of the chamber the valve is moved toward its closed position; while upon deflation or contraction of the expansible chamber the valve is moved away from its closed position to permit the feed of the fluid to the place of use. It sometimes happens that the expansible chamber or its conduit or the thermostatic bulb is ruptured or broken so that the pressure fluid therein is permitted to escape, whereupon the expansible chamber collapses. This collapse is accompanied by an opening of the valve to more or less its full extent so that the fluid is continuously fed by the valve at practically its maximum rate, the flow of such fluid being no longer controlled by the valve. Such a situation is in many instances not only undesirable but actually dangerous.

It is the object of the present invention to provide a valve of the type indicated above which is so constructed that upon collapse of the expansible chamber beyond a normal point for any reason whatsoever the valve is automatically closed and the feed of fluid is stopped. It is also an object of the present invention to provide a control valve having such safety feature embodied therein and constructed in a simple manner and of very few parts so that the same can be manufactured at a low cost. Other objects of the invention will be apparent from the following description and the features of novelty will be pointed out in the claims.

In the accompanying drawing, I illustrate a form of my invention especially adapted for controlling the feed of fuel gas to a burner, but it will be understood that such showing is by way of illustration only and that with slight modifications my improved valve may be adapted for use in other situations. In said drawing, Fig. 1 is a top plan view, of a valve constructed in accordance with the present invention, and Fig. 2 is a central vertical section therethrough.

The numeral 10 indicates a casing or body having a passageway therethrough within which is located a valve seat 11. The seat is arranged to be engaged by a valve head 12, fixed to a valve stem 13 in any suitable manner, as by means of a pin 14. The stem 13 is guided within an opening in the wall of the housing 15 which is attached to the valve casing in any desired way. The bottom of the stem 13 rests upon the top wall of an expansible chamber composed of a diaphragm or bellows 16 connected by a capillary tube 17 to a thermostatic bulb 18 which is adapted to pass through the wall of an apparatus whose temperature is to be controlled, the bulb being fixed to such wall by means of the connection 19. The valve casing 10 is provided with an inlet 20 adapted to be connected with the gas main, and is provided also with an outlet 21 from which the gas is conveyed to a burner arranged to heat directly or indirectly the contents of the apparatus in which the bulb 18 is located. The valve-head 12 is provided with an opening 22 for a purpose which will appear hereinafter.

The stem 13 projects above the valve seat 11 and upon its upper end supports loosely a safety plate 23. The valve interior is rendered gastight with the aid of a flexible diaphragm 24 of any suitable material which is clamped against the valve casing by means of a cap 25 screwed to the top of the casing. A spring guide 26 rests upon the outer face of the diaphragm and is provided with an enlarged base 27. A spring 28 is coiled about the guide 26 and is positioned between the base 27 and a rotatable screw 29 which passes through a tapped hole in the cap 25. By rotating the screw 29, the pressure of the spring 28 against the plate 23 and consequently against the expansible bellows 16 may be varied so as to predetermine the temperature maintained in the apparatus by the control valve. A pointer 30 may be made to cooperate with a scale 31 upon the exterior surface of the cap to indicate the temperature to be maintained by the valve in the apparatus in which the bulb is rotated. It will be noted that the use of the diaphragm 24 makes it unnecessary to provide a gas-proof packing about the screw 29.

The bulb 18, bellows 16 and tube 17 may be completely filled with a liquid under pressure so as to cause the bellows to expand sufficiently, for instance, 0.080 of an inch, to hold the disk 23 and valve 12 off the seat 11. It will be understood that the stem 13 is suitably dimensioned to accomplish this result. As the temperature in the locality of the bulb 18 rises, the liquid will expand, or a part of the liquid will vaporize and the bellows expand, and the thermostatic system will then function as a vapor tension system. As the bellows is normally under superatmospheric pressure, failure, i. e. rupture or leakage, of the bellows will cause the same to collapse to such an extent as to permit the safety plate or valve element 23 to be moved by spring 28 to its closed position to cut off the supply of fluid through the outlet 21.

The operation of the device will be clear from the description hereinabove. The valve is so adjusted as normally to feed gas at a maximum rate as the heating of any particular apparatus is begun. As the temperature rises, the liquid in the thermostatic system expands or partially vaporizes and expands and causes the bellows to move the valve 12 toward its seat against the resistance of spring 28 to diminish the flow of gas. As the supply of gas decreases, the temperature likewise decreases so that the bellows contract and permit the valve 12 to open to a greater extent under the action of the spring. When the rate of flow of gas is such as to produce equilibrium between the pressures of the bellows and the spring, the valve becomes stationary and automatically feeds just enough gas to maintain the temperature predetermined by the setting of spring 28.

If the temperature rises so high as to cause the valve 12 to engage its seat, sufficient gas will be fed through the opening 22 to maintain a minimum flame, which may serve as a pilot light. Should, however, any part of the thermostatic system become ruptured or leaky, so that the fluid under pressure therein escapes, the bellows will collapse and permit the safety disk 23, which operates as a second valve element, to be pressed against the seat 11 by the spring 28, thereby shutting off the valve entirely. The burner will thereupon be extinguished and an attendant will in this way become aware that the thermostatic system is defective.

It will be evident that as my improved control device is operated by pressure it is adapted not only for the control of temperature but also for the control of pressure. Where, therefore, in the claims I refer to a temperature responsive member, such expression is to be understood as including also a pressure responsive member as its equivalent.

Variations from the specific form of the invention shown and described may be resorted to within the scope of the appended claims without departing from the spirit of the invention. The safety plate 23, for example, and its associated parts may be so arranged that the former closes the valve only partially, or it may be provided with a pilot opening similar to the opening 22.

I claim:

1. A control valve for regulating the flow of a fluid in response to variations in temperature at a selected point, comprising a valve casing having a passageway therein, a valve seat in said casing, a valve stem, two valve elements positioned on said stem one on each side of said seat, an expansible member associated with said valve elements and operative in response to variations in temperature at said point to control said passageway through one of said elements, an opening through such element, whereby a fixed amount of fluid is fed when said element is in its closed position, and a spring operative upon collapse of said expansible member to force the other element against the valve seat to close said passageway completely.

2. A control valve for regulating the flow of a fluid in response to variations in temperature at a selected point, comprising a valve casing having a passageway therein, a valve seat in said casing, a valve stem, two valve elements positioned on said stem one on each side of said seat, an expansible member associated with said valve elements and operative in response to variations in temperature at said point to control said passageway through one of said elements, an opening through such element, whereby a fixed amount of fluid is fed when said element is in its closed position, a diaphragm clamped to the walls of said casing to maintain air-tight the space in which the valve elements are located, and a spring acting against said diaphragm and opposing the pressure of said expansible member, said spring operative upon injury to the expansible member to urge the other element against the seat to close the passageway completely.

3. A control valve for regulating the flow of a fluid in response to variations in temperature at a selected point, comprising a valve casing having a passageway therein, valve seats in said casing, a valve stem, two valve elements positioned on said stem and adapted to engage said seats, a heat responsive member associated with said valve elements and operative in response to variations in temperature at said point to control said passageway through one of said elements, a diaphragm fixed to the walls of said casing to maintain air-tight the space in which the valve elements are located and arranged to transmit movement to said valve elements, and a spring bearing against the outer side of said diaphragm and opposing the pressure of said heat responsive member upon said valve elements, said spring operative upon injury to the expansible member to urge the other element against its seat to close the passageway completely.

4. A control valve for regulating the flow of a fluid in response to variations in temperature at a selected point, comprising a valve casing having a passageway therein, a valve element movable in said casing to control said passageway, thermostatic mechanism operatively associated with said valve element to effect adjustment thereof in response to said temperature variations, said mechanism including a bellows containing a fluid which at all temperatures, including atmospheric temperature, within the working range of such mechanism, is above the pressure of the immediate surroundings so that said bellows normally is expanded and is therefore adapted to collapse upon rupture of such mechanism, and a second valve element movable in said casing to control said passageway and arranged to follow the collapsing movement of said bellows, thus becoming automatically operative upon rupture of said mechanism to effect closing of said passageway.

5. A control valve for regulating the flow of a fluid in response to variations in temperature or pressure at a selected point, comprising a valve casing having a passageway therein, a valve seat in said casing, a valve element movable toward and away from said seat to control said passageway, an expansible bellows adapted to contain a fluid which at all temperatures, including atmospheric temperature, within the working range of such bellows, is above the pressure of the immediate surroundings so that said bellows is normally expanded and is therefore adapted to collapse upon rupture thereof, said bellows operatively associated with said valve element to move the latter toward said seat upon increase of pressure within said bellows, a spring effective upon said valve element to move the same away from said valve seat upon fall of pressure in said bellows, and a second valve element movable in said casing to control said passageway and arranged to follow the collapsing movement of the bellows, thus becoming automatically operative to close said passageway upon rupture of said bellows and fall of the pressure therein to the pressure of its surroundings.

6. A control valve for regulating the flow of fluid in response to variations in temperature at a selected point, comprising a valve casing having a passageway therein, a valve stem mounted within said casing and having two valve elements thereon, valve seats for said valve elements, thermostatic mechanism including an expansible bellows containing a fluid which at all temperatures, including atmospheric temperature, within the working range of such mechanism, is above the pressure of the immediate surroundings, so that said bellows normally is expanded and is therefore adapted to collapse upon rupture of such mechanism, said bellows acting against one end of said valve stem and normally adjusting one of said valve elements with respect to its seat in response to said temperature variations and holding the other valve element away from its seat, said bellows adapted upon rupture to collapse sufficiently to enable the second valve element to engage its seat, and a spring effective upon the other end of said valve stem to cause said valve elements to follow the collapsing movements of said bellows and of sufficient strength to cause closing of said other valve element upon rupture of said mechanism.

7. A control valve as set forth in claim 5, including means for adjusting the pressure of said spring, whereby the temperature controlled by said valve may be predetermined.

8. A control valve as set forth in claim 5, including a diaphragm fixed to the walls of said casing to maintain gas-tight the space in which the valve elements are located and arranged to transmit movement to said valve elements, and adjusting means operable from outside the casing at the side of the diaphragm opposite the valve elements to effect adjustment of said spring.

FRANK J. BAST.